United States Patent
Cui

(10) Patent No.: US 11,890,974 B2
(45) Date of Patent: Feb. 6, 2024

(54) CHILD SAFETY SEAT

(71) Applicant: Wonderland Switzerland AG, Steinhausen (CH)

(72) Inventor: Zong Wang Cui, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 17/367,485

(22) Filed: Jul. 5, 2021

(65) Prior Publication Data

US 2022/0009386 A1    Jan. 13, 2022

(51) Int. Cl.
*B60N 2/28*    (2006.01)

(52) U.S. Cl.
CPC ......... *B60N 2/2839* (2013.01); *B60N 2/2821* (2013.01); *B60N 2/2875* (2013.01)

(58) Field of Classification Search
CPC ... B60N 2/2839; B60N 2/2821; B60N 2/2875
See application file for complete search history.

(56) References Cited

U.S. PATENT DOCUMENTS

| | | | |
|---|---|---|---|
| 6,139,099 A * | 10/2000 | Skold | B60N 2/28 297/250.1 |
| 9,434,279 B2 | 9/2016 | Williams | |
| 10,272,804 B2 * | 4/2019 | Williams | B60N 2/2875 |
| 2016/0114706 A1 * | 4/2016 | Hutchinson | B60N 2/2863 297/256.13 |
| 2016/0200225 A1 | 7/2016 | Van Der Veer et al. | |
| 2018/0015848 A1 * | 1/2018 | Pacella | B60N 2/2803 |
| 2018/0126877 A1 * | 5/2018 | Williams | B60N 2/2875 |
| 2019/0135141 A1 | 5/2019 | Bennett et al. | |
| 2019/0217751 A1 * | 7/2019 | Kaiser | B60N 2/2824 |

FOREIGN PATENT DOCUMENTS

| | | |
|---|---|---|
| DE | 102007048406 A1 | 2/2009 |
| EP | 3564067 A1 | 11/2019 |
| EP | 3587175 A1 | 1/2020 |
| WO | 2005108155 A2 | 11/2005 |

OTHER PUBLICATIONS

Office Action and search report dated Feb. 28, 2022 in Swedish counterpart 2150895-7.

* cited by examiner

*Primary Examiner* — David R Dunn
*Assistant Examiner* — Tania Abraham
(74) *Attorney, Agent, or Firm* — NZ CARR LAW OFFICE

(57) ABSTRACT

A child safety seat includes a child seat, and a support base having a shell body adapted to provide support for the child seat. The support base includes an anti-rebound part and a locking mechanism. The anti-rebound part is connected with the shell body for sliding movements along a sliding axis, the anti-rebound part having an abutting portion tilted relative to the sliding axis that extends upward at a front of the child seat, the anti-rebound part being slidable along the sliding axis relative to the shell body for displacing the abutting portion away from the child seat or toward the child seat so as to adjust a leg room for a child. The locking mechanism is operable to lock the anti-rebound part in position with respect to the shell body.

26 Claims, 13 Drawing Sheets

CHILD SAFETY SEAT

CROSS-REFERENCE TO RELATED APPLICATION(S)

This application claims priority to China patent application no. 202010654142.5 filed on Jul. 8, 2020.

BACKGROUND

1. Field of the Invention

The present invention relates to child safety seats.

2. Description of the Related Art

Child safety seats currently available on the market usually include a child seat that can be attached to a support base for easy installation on a vehicle seat. When the child safety seat is installed in a rear facing position, the child safety seat and the child sitting thereon may be forcibly thrown towards the rear of the vehicle when a frontal or rear collision occurs, which may cause the child's head to contact the vehicle seatback.

To address the aforementioned issue, certain child safety seat may have an anti-rebound element that can abut against the seatback of the vehicle seat to counteract rearward rotation of the child safety seat. Because the anti-rebound element is generally attached to the child seat, the leg room at the front of the child seat may be affected by the presence of the anti-rebound element. Although certain products allow the anti-rebound element to be movably adjusted for increasing or reducing the leg room, the range of adjustment is still limited by the extension of the anti-rebound element relative to the child seat. Moreover, the requisite adjustment mechanism for the anti-rebound element results in a more complex construction of the child seat.

Therefore, there is a need for an improved child safety seat that can address at least the foregoing issues.

SUMMARY

The present application describes a child safety seat having an anti-rebound part that can address the foregoing reasons.

According to an embodiment, the child safety seat includes a child seat, and a support base having a shell body adapted to provide support for the child seat. The support base includes an anti-rebound part and a locking mechanism. The anti-rebound part is connected with the shell body for sliding movements along a sliding axis, the anti-rebound part having an abutting portion tilted relative to the sliding axis that extends upward at a front of the child seat, the anti-rebound part being slidable along the sliding axis relative to the shell body for displacing the abutting portion away from the child seat or toward the child seat so as to adjust a leg room for a child. The locking mechanism is operable to lock the anti-rebound part in position with respect to the shell body.

DETAILED DESCRIPTION OF THE EMBODIMENTS

Figure 1:
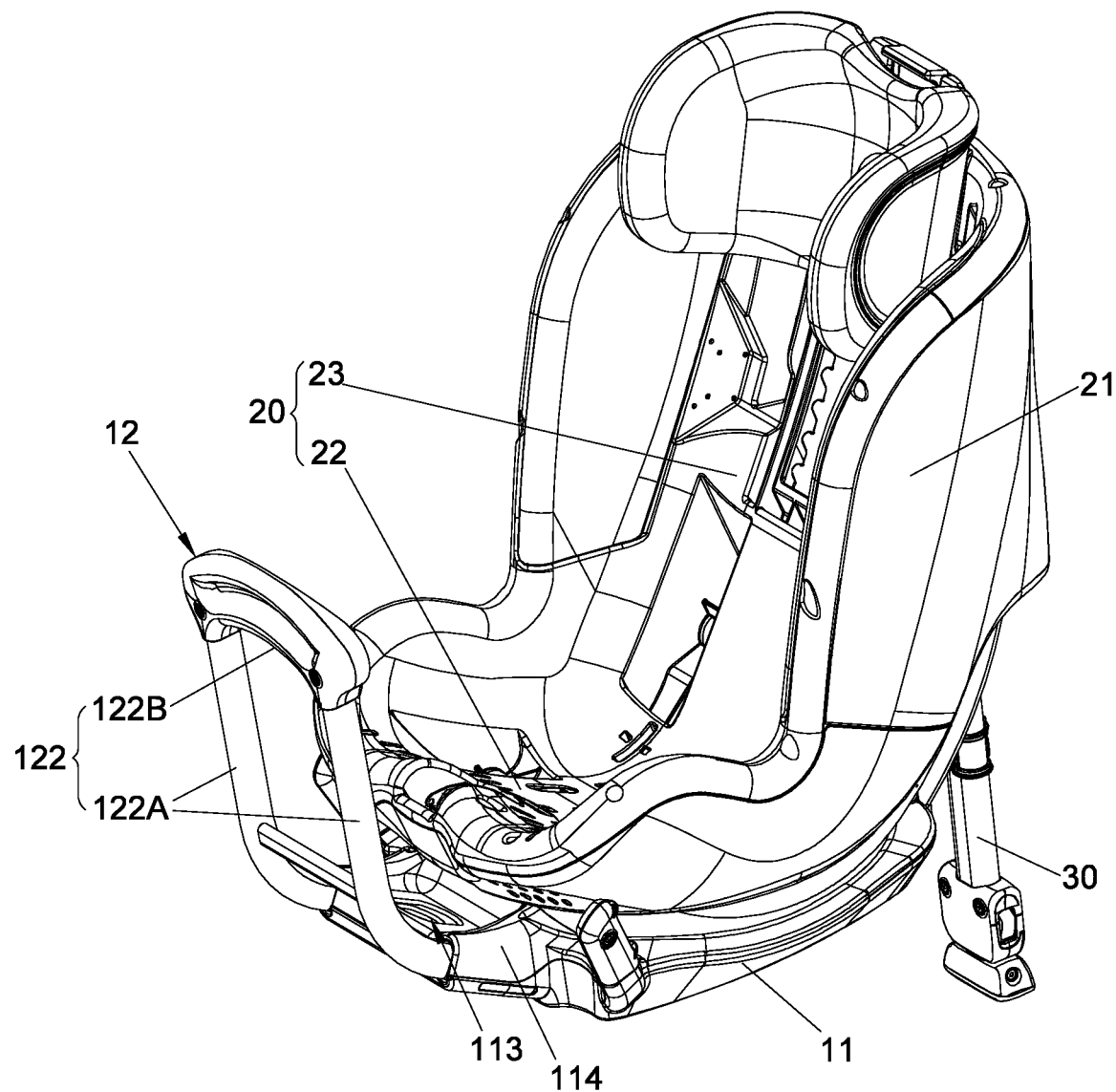
FIG. 1 is a perspective view illustrating an embodiment of a child safety seat.
Figure 2:
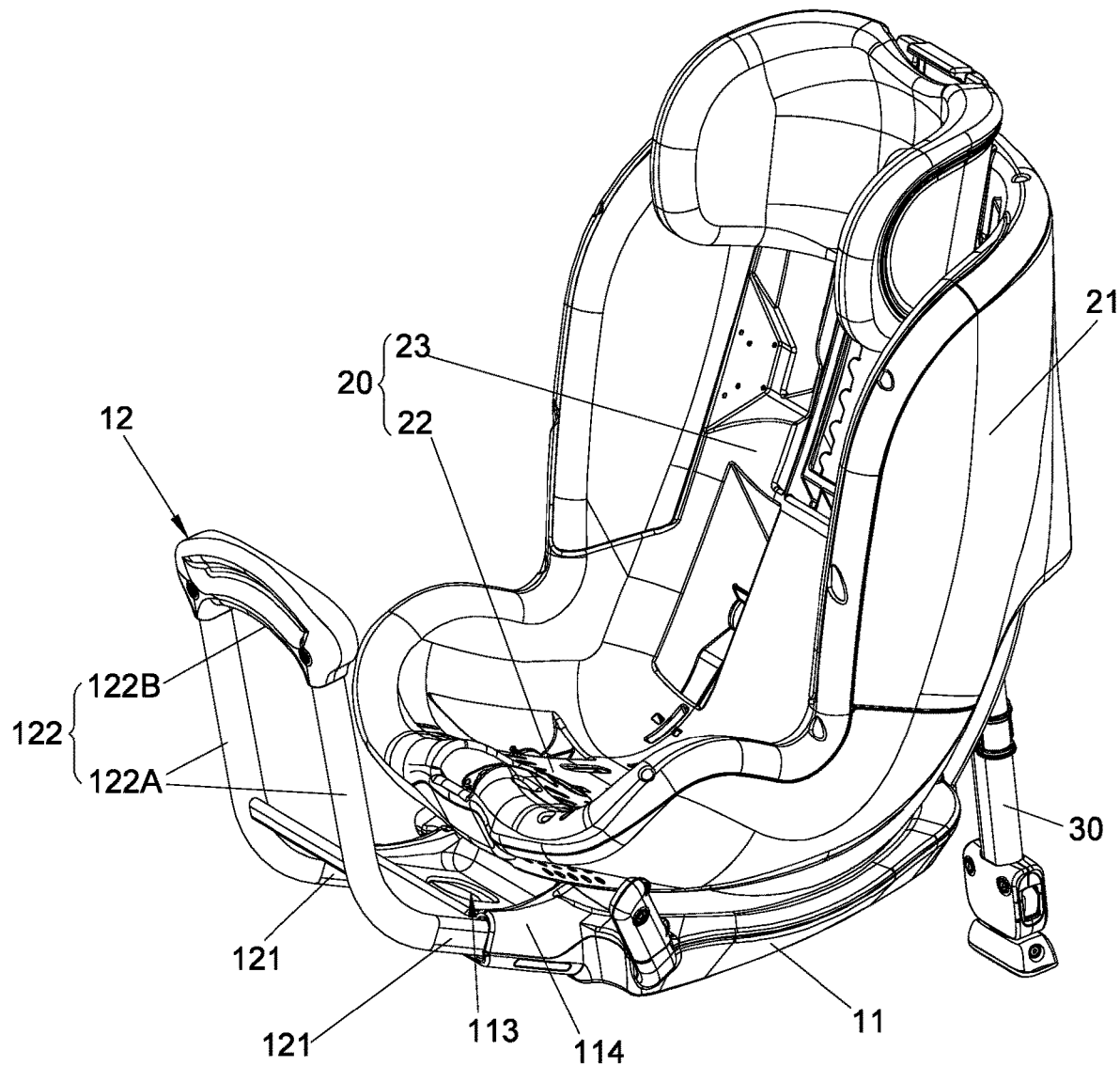
FIG. 2 is a perspective view illustrating the child safety seat of FIG. 1 having an anti-rebound part in an extended position.
Figure 3:
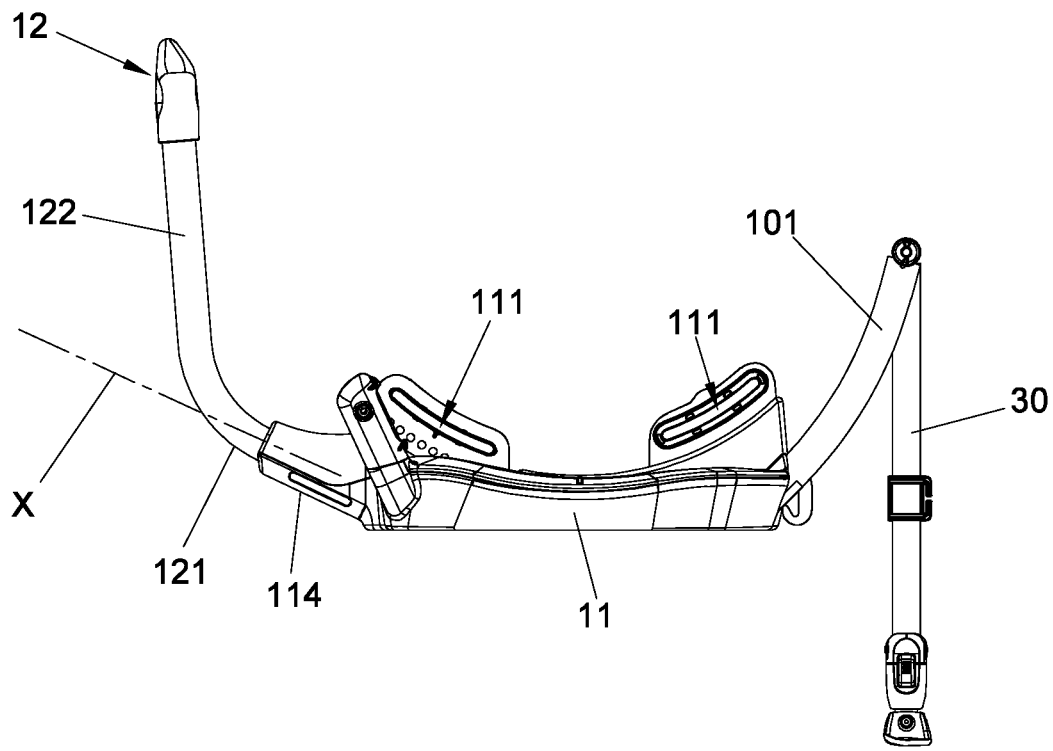
FIG. 3 is a side view illustrating a support base of the child safety seat shown in FIG. 1.
Figure 4:
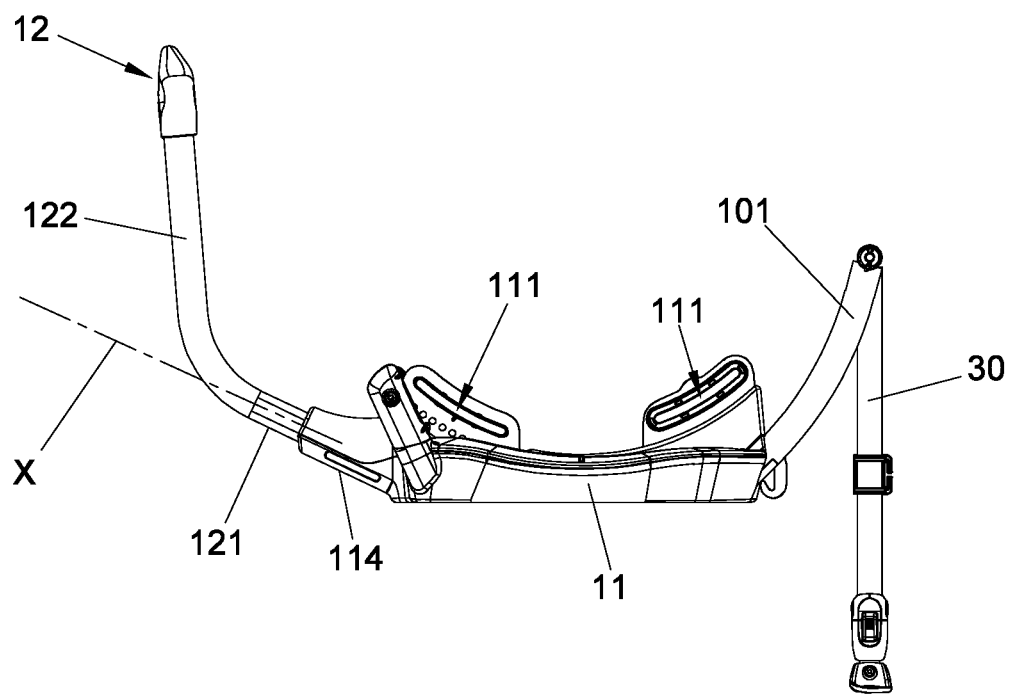
FIG. 4 is a side view illustrating the support base with the anti-rebound part in the extended position.
Figure 5:
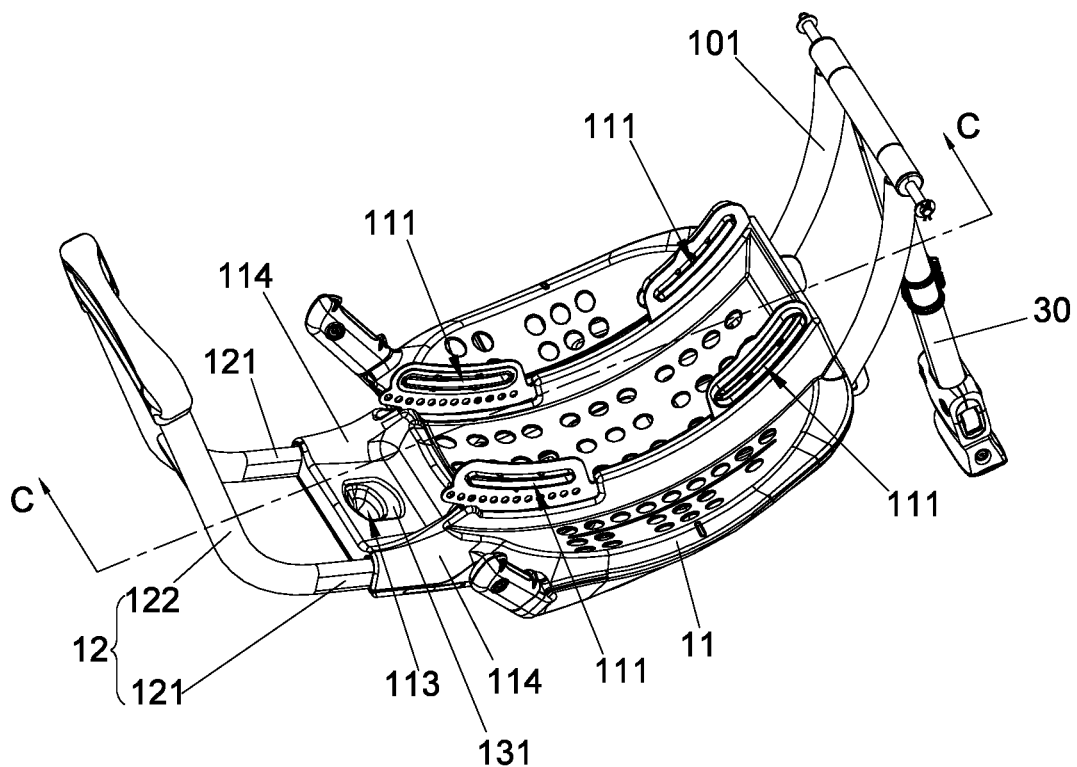
FIG. 5 is a perspective view illustrating the support base of the child safety seat.
Figure 6:
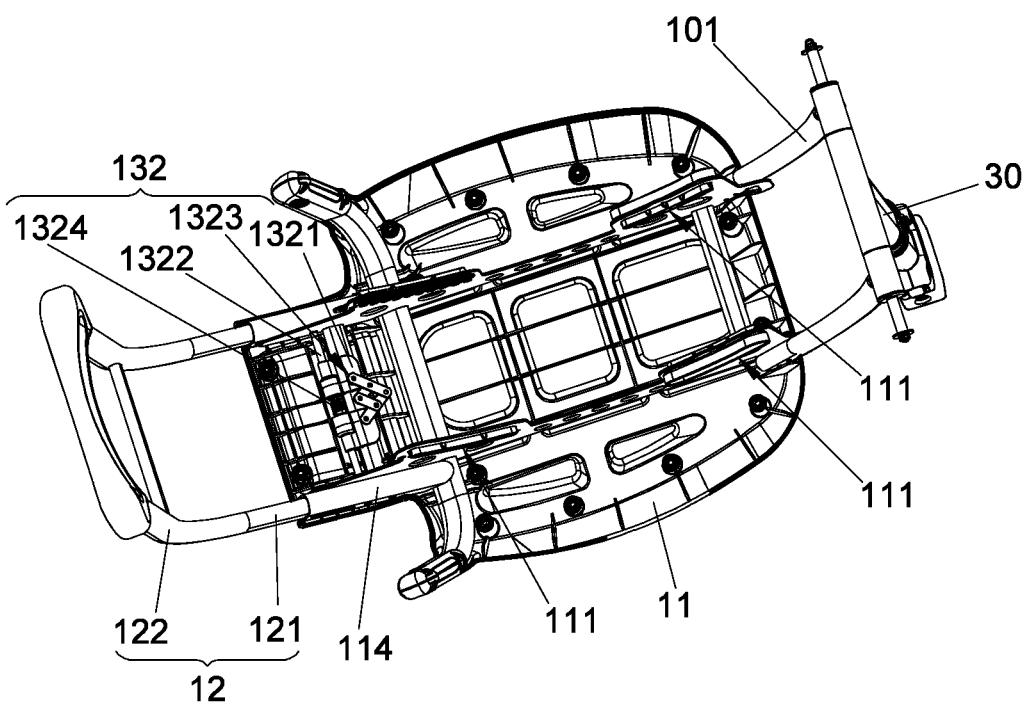
FIG. 6 is a schematic view illustrating some inner construction details of the support base.

Referring to FIGS. 1 and 2, a child safety seat 100 includes a support base 10 and a child seat 20. The support base 10 can have a shell body 11 adapted to provide support for the child seat 20. The child seat 20 includes a seat shell 21 having a seat portion 22 and a backrest portion 23. According to an example of construction, the seat portion 22 and the backrest portion 23 may be provided as detachably connected parts for facilitating the assembly and disassembly of the child seat 20. According to another example of construction, the seat shell 21 including the seat portion 22 and the backrest portion 23 may be provided as a single integral part made of plastic materials. According to one configuration, the child seat 20 can be arranged on the shell body 11 of the support base 10 in a rearward facing position (as shown in FIGS. 1 and 2) so that a child can be seated facing rearward in a vehicle. According to another configuration, the child seat 20 may be arranged on the shell body 11 of the support base 10 in a forward facing position (not shown) so that a child can be seated facing forward in the vehicle.

Referring to FIGS. 1-7, 10 and 12, the child seat 20 can be assembled with the shell body 11 of the support base 10 via a sliding connection that allows recline adjustment of the child seat 20. According to an example of construction, the shell body 11 can have two recline guide slots 111 transversally spaced-apart from each other that are disposed adjacent to a first end of the shell body 11, and two recline guide slots 111 transversally spaced-apart from each other that are disposed adjacent to a second end of the shell body 11, all the recline guide slots 111 being provided at a top of the shell body 11. The child seat 20 may have a first rod (not shown) disposed for sliding movement along the two recline guide slots 111 at the first end of the shell body 11, and a second rod (not shown) disposed for sliding movement along the two recline guide slots 111 at the second end of the shell body 11. The child seat 20 can thereby slide rearward and forward relative to the support base 10 for recline adjustment, e.g., the child seat 20 may be adjusted to an upright position as shown in FIG. 1, or reclined rearward (not shown) for seating a child of a smaller size. Although the foregoing description has illustrated an example of construction for the sliding connection, it will be appreciated that other known constructions may be applied to slidably connect the child seat 20 with the support base 10.

Referring to FIGS. 1-11, the support base 10 can include a support extension 101, a support leg 30 connected with the support extension 101, an anti-rebound part 12, and an adjustment mechanism 13 associated with the anti-rebound part 12. The support extension 101 can be connected with an end of the shell body 11, and can exemplarily have a frame structure comprised of two parallel side bars and a transversal bar connected with the two side bars. The support extension 101 can have a curved shape that extends upward from the shell body 11 and can at least partially conform with a rear profile of the child seat 20 (which can include a lower portion of the backrest portion 23). The support leg 30 has an end connected with an upper end of the support extension 101, e.g., the transversal bar of the support extension 101. When the support base 10 is installed on a vehicle seat, the support leg 30 can be arranged to extend downward from the support extension 101 along a substantially vertical direction and abut against the vehicle floor. The support extension 101 allows a higher extent of the support leg 30 relative to the support base 10, which can provide a more stable installation of the support base 10 on a vehicle seat.

Referring to FIGS. 1-7, the anti-rebound part 12 can be connected with and protrude forward and upward from an end of the shell body 11 opposite to the support extension 101. More specifically, the anti-rebound part 12 can be slidably connected with the shell body 11 for sliding movements along a sliding axis X. In this manner, the anti-rebound part 12 can slide relative to the shell body 11 for adjustment between different positions, which may include a retracted position shown in FIGS. 1 and 3 and an extended position shown in FIGS. 2 and 4. According to an example of construction, the anti-rebound part 12 can include two side bar portions 121 transversally spaced apart from each other, and an abutting portion 122 respectively connected with the two side bar portions 121. The anti-rebound part 12 including the side bar portions 121 and the abutting portion 122 may have a tubular structure that is formed integrally as a single part or comprised of multiple tube segments fastened to one another. The two side bar portions 121 are slidably connected with the shell body 11. According to an example of construction, the shell body 11 can have a housing portion 114 projecting forward at an underside of the child seat 20, and the two side bar portions 121 of the anti-rebound part 12 can be slidably disposed through two openings provided in the housing portion 114. The two side bar portions 121 can retract toward the interior of the shell body 11 when the anti-rebound part 12 slides along the sliding axis X in a retracting direction, and extend outward when the anti-rebound part 12 slides along the sliding axis X in an extending direction.

The abutting portion 122 is arranged to extend at a front of the child seat 20 so that a leg room can be defined between the abutting portion 122 and the child seat 20 for placement of a child's legs. More specifically, the abutting portion 122 extends upward at an angle from the side bar portions 121, and is tilted relative to the sliding axis X of the anti-rebound part 12, the abutting portion 122 being preferably sized to extend higher than the seat portion 22 at the front of the child seat 20. According to an example of construction, the abutting portion 122 can have two side segments 122A respectively connected with the two side bar portions 121, and a transversal portion 122B respectively connected with the two side segments 122A. In use, the transversal portion 122B can serve as a footrest for a child sitting on the child seat 20. Moreover, the anti-rebound part 12 can slide along the sliding axis X relative to the shell body 11 for displacing the abutting portion 122 away from the child seat 20 or toward the child seat 20, which can adjust the leg room at the front of the child seat 20.

Referring to FIGS. 5-11, the adjustment mechanism 13 is assembled with the shell body 11, and can include a release actuator 131 and a locking mechanism 132. The locking mechanism 132 is disposed inside the shell body 11 and is operable to engage and disengage the anti-rebound part 12, wherein the locking mechanism 132 can engage with the anti-rebound part 12 for locking the anti-rebound part 12 in position with respect to the shell body 11. The release actuator 131 is connected with the locking mechanism 132, and is exposed for operation. The release actuator 131 is operable to cause the locking mechanism 132 to disengage from the anti-rebound part 12 so that the anti-rebound part 12 is unlocked for sliding adjustment along the sliding axis X. According to an example of construction, the release actuator 131 can be movably coupled to the locking mechanism 132, whereby the release actuator 131 and the locking mechanism 132 can move concurrently to lock and unlock the anti-rebound part 12. The anti-rebound part 12 can thus be conveniently and quickly adjusted between the extended position and the retracted position.

Referring to FIGS. 5-11, the locking mechanism 132 includes two latches 1320, and two linkage assemblies 1323 that respectively couple the two latches 1320 to the release actuator 131. The two latches 1320 can be disposed inside the shell body 11 transversally spaced apart from each other, each latch 1320 being movable to engage with one corresponding side bar portion 121 for locking the anti-rebound part 12 or disengage from the side bar portion 121 for unlocking the anti-rebound part 12. According to an example of construction, the two latches 1320 can be respectively connected slidably with the shell body 11, whereby the two latches 1320 can slide transversally relative to the shell body 11 away from each other for respectively engaging with the two side bar portions 121 of the anti-rebound part 12 and can slide transversally toward each other for respectively disengaging from the two side bar portions 121 of the anti-rebound part 12.

According to an example of construction, each latch 1320 can include a coupling part 1321, and a locking portion 1322 fixedly connected with the coupling part 1321. The shell body 11 can be fixedly connected with a transversal rail 112, and the coupling part 1321 can be slidably connected with the transversal rail 112. For example, the coupling part 1321 of the latch 1320 can have a sleeve portion 13211 slidably mounted on the transversal rail 112 with the transversal rail 112 passing through the sleeve portion 13211. The transversal rail 112 may be fixedly fastened to the shell body 11 or formed integrally therewith, and the sliding connection of the coupling part 1321 with the transversal rail 112 allows the latch 1320 to slide along the transversal rail 112.

The locking portion 1322 of the latch 1320 can protrude sideways from the coupling part 1321 for facilitating its engagement with the side bar portion 121 of the anti-rebound part 12. According to an example of construction, the coupling part 1321 can have a mount portion 13212 fixedly connected with the sleeve portion 13211, and the locking portion 1322 can have a pin shape and can be fixedly attached to the mount portion 13212. The sleeve portion 13211 and the mount portion 13212 may be formed integrally with the coupling part 1321 as a single part, or may be separate parts fastened to each other to form the coupling part 1321. According to an example of construction, the latch 1320 including the coupling part 1321 and the locking portion 1322 may also be formed integrally as a single part.

Figure 8:
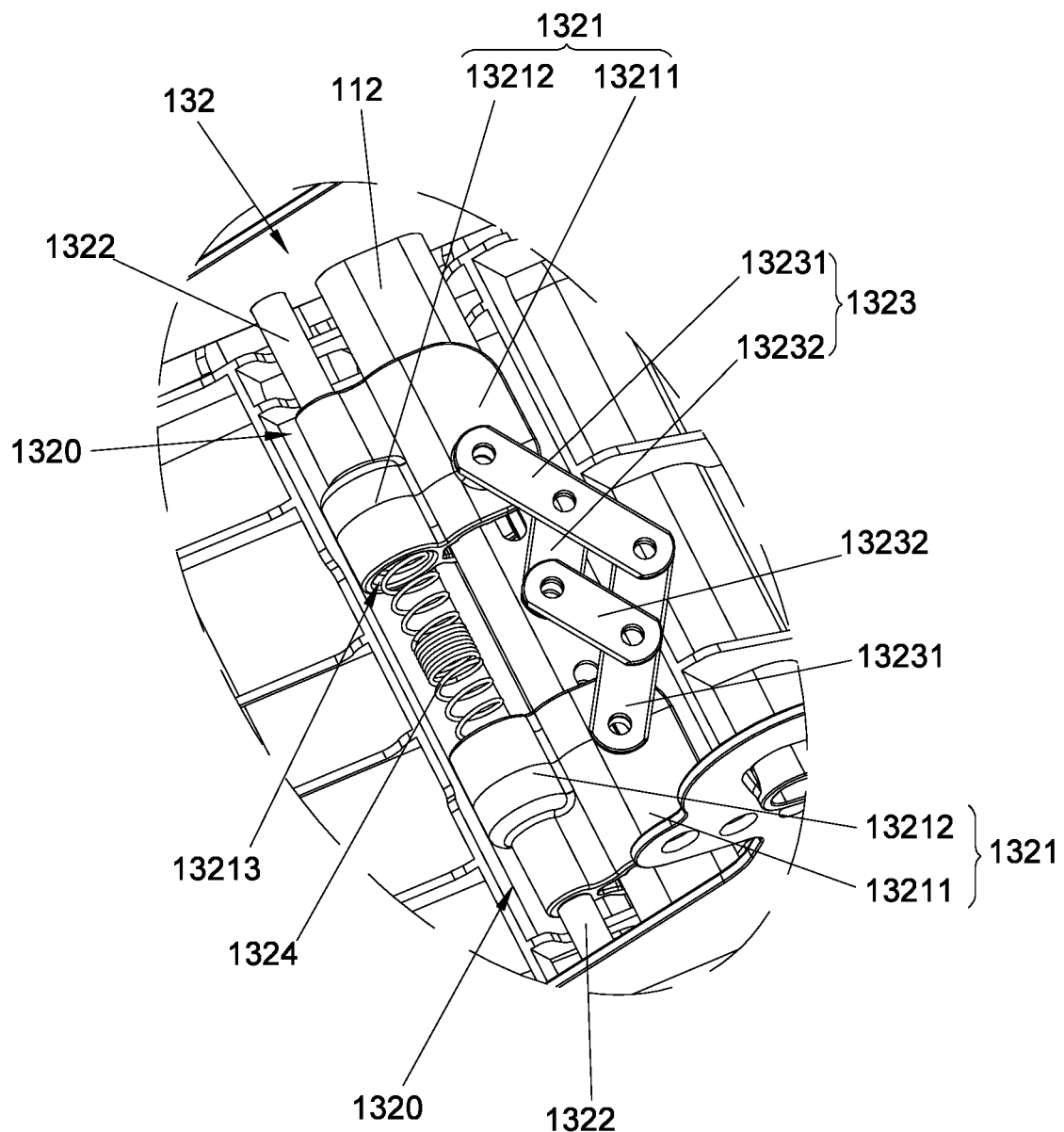
FIG. 8 is an enlarged view of portion A shown in FIG. 7.
Figure 9:
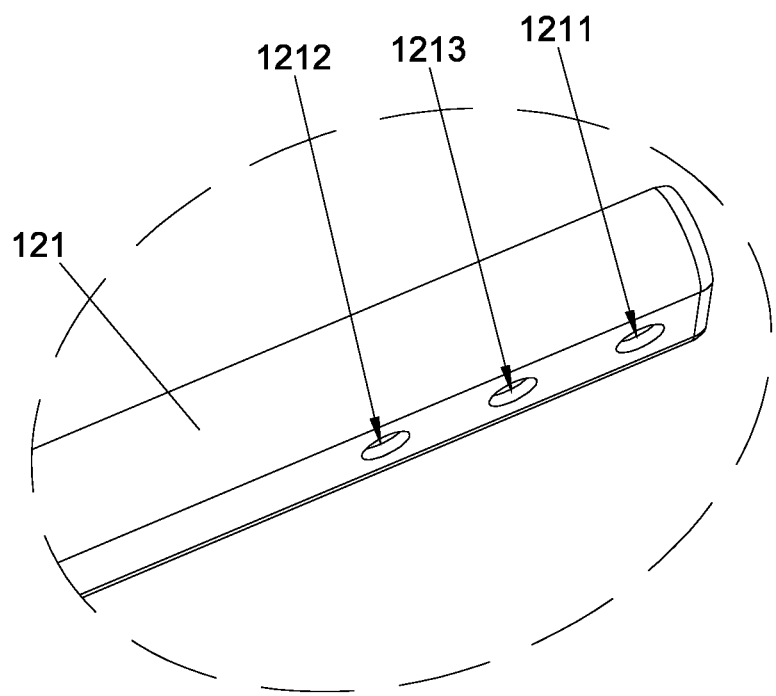
FIG. 9 is an enlarged view of portion B shown in FIG. 7.
Figure 10:
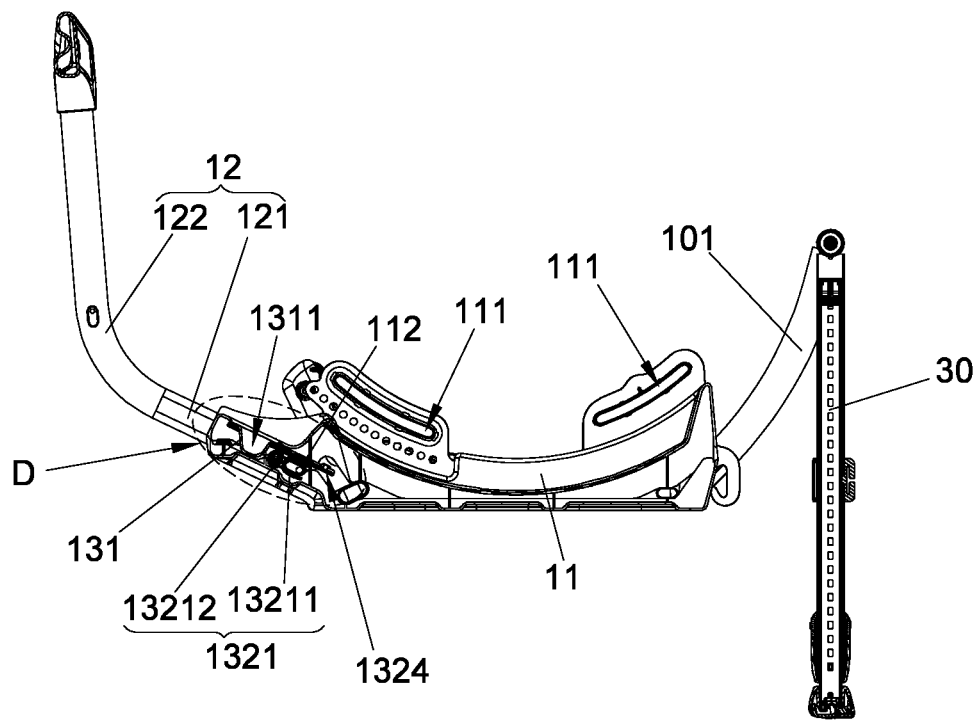
FIG. 10 is a cross-sectional view taken along section C-C as shown in FIG. 5.
Figure 11:
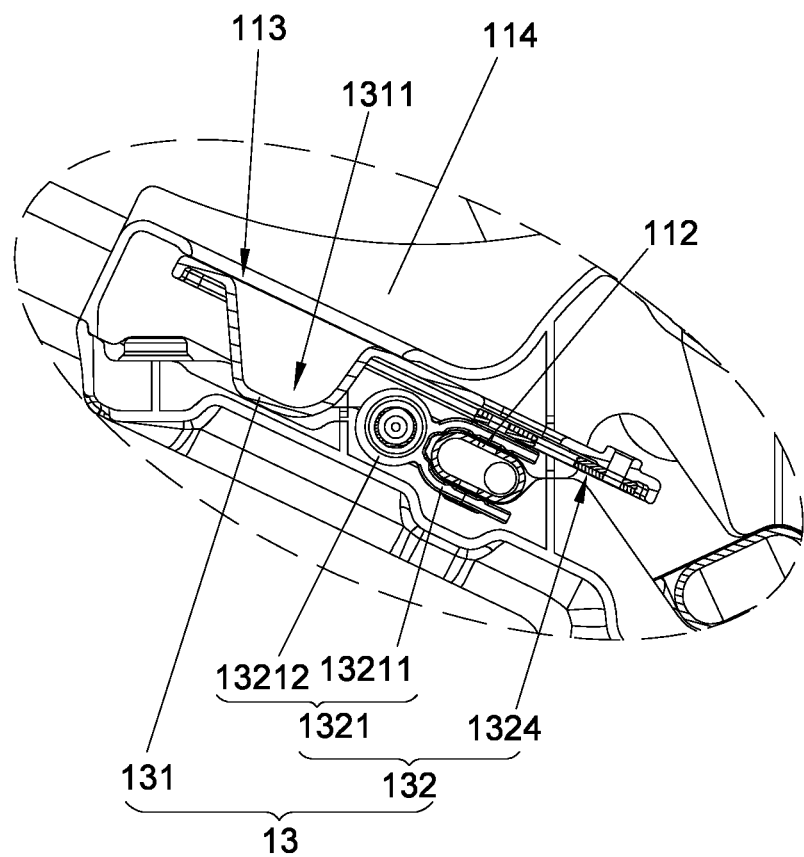
FIG. 11 is an enlarged view of portion D shown in FIG. 10.

Referring to FIGS. 8 and 9, each side bar portion 121 of the anti-rebound part 12 may include a plurality of locking holes 1211, 1212 and 1213 (better shown in FIG. 9) spaced apart from one another that are adapted to receive the engagement of the locking portion 1322 of the corresponding latch 1320. For example, the latch 1320 can engage with the locking hole 1211 to lock the anti-rebound part 12 in the extended position, engage with the locking hole 1212 to lock the anti-rebound part 12 in the retracted position, and engage with the locking hole 1213 to lock the anti-rebound part 12 in an intermediate position between the extended position and the retracted position. Therefore, the anti-rebound part 12 can be locked in different positions for desirably adjusting the leg room at the front of the child safety seat 100 in accordance with the size of a child.

Referring to FIGS. 5-8, the two linkage assemblies 1323 can be similar in construction, each of which having an end pivotally connected with the release actuator 131 and another end pivotally connected with the coupling part 1321 of the corresponding latch 1320. According to an example of construction, the linkage assembly 1323 can include two linking parts 13231 and 13232. The linking parts 13231 and 13232 may include, without limitation, rods, plates, and the like. The linking parts 13231 and 13232 are applicable in a construction where the latch 1320 and the release actuator 131 respectively slide along substantially orthogonal axes. The linking part 13231 may have an end pivotally connected with the release actuator 131, and another end pivotally connected with the coupling part 1321 of the latch 1320. The linking part 13232 can have an end pivotally connected with the shell body 11, and another end pivotally connected with the linking part 13231 at a location between the pivotal connection of the linking part 13231 with the release actuator 131 and the pivotal connection of the linking part 13231 with the coupling part 1321 of the latch 1320. According to an example of construction, the two linking parts 13231 may be respectively connected pivotally with the release actuator 131 about a same pivot connection, and the two linking parts 13232 may be respectively connected pivotally with the shell body 11 about a same pivot connection for a compact assembly. The linkage assembly 1323 described herein can movably link the release actuator 131 to the corresponding latch 1320, and can assist to restrict the range of sliding displacement of the latch 1320.

Referring to FIGS. 1, 2, 5-8, 10 and 11, the release actuator 131 is slidably connected with the shell body 11, and is exposed for operation at an opening 113 provided on the shell body 11. More specifically, the release actuator 131 can be slidably connected with the housing portion 114, and the opening 113 may be provided on the housing portion 114 of the shell body 11 at a middle position between a left and a right side thereof. For facilitating access to the release actuator 131, the opening 113 may be exemplarily provided on an upper surface of the housing portion 114 facing upward. According to an example of construction, the release actuator 131 may be formed integrally as a single part. The release actuator 131 can have an inner portion pivotally connected with the linking part 13231, and an actuating portion exposed in the opening 113. The actuating portion of the release actuator 131 can have any suitable structure for facilitating manual operation of the release actuator 131. For example, the actuating portion of the release actuator 131 can have a recess 1311 where a caregiver can place his/her fingers for operating the release actuator 131. According to another example of construction, the actuating portion of the release actuator 131 may have a protruding structure that may be grasped by a caregiver for operating the release actuator 131.

Figure 7:
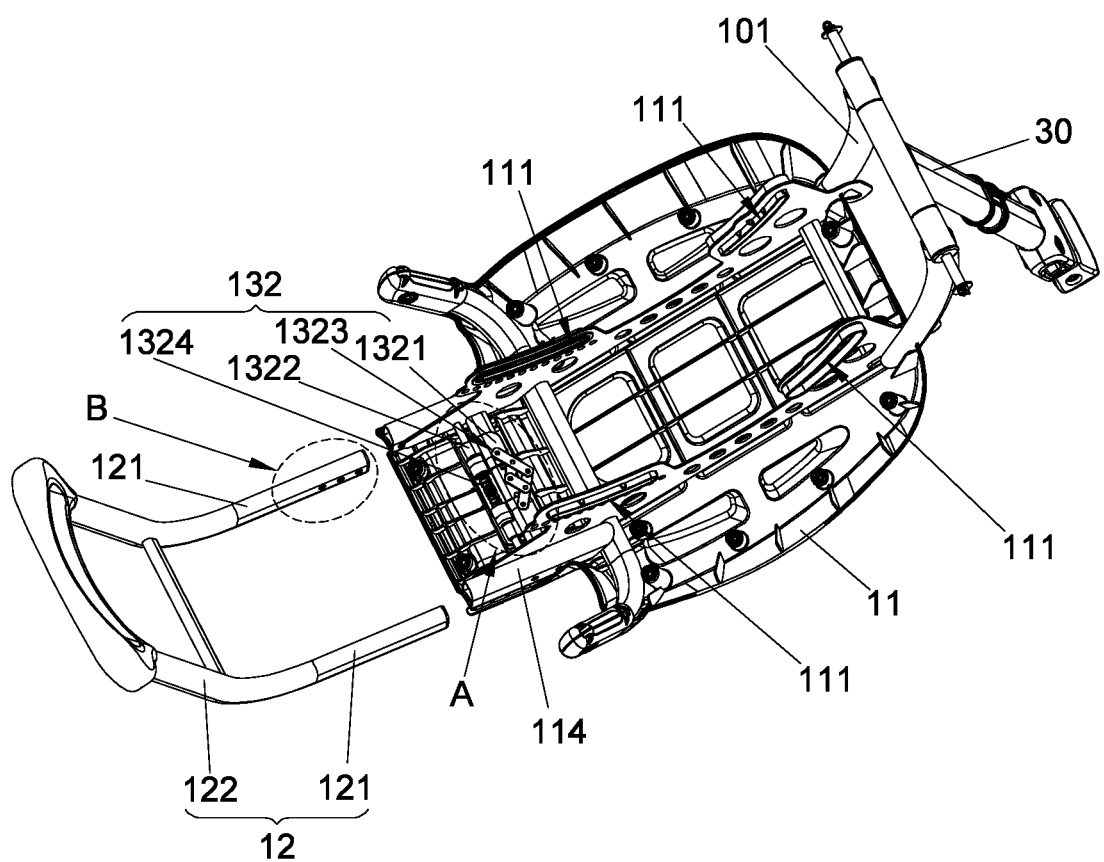
FIG. 7 is a schematic view illustrating further construction details of the support base.

Referring to FIGS. 7 and 8, the locking mechanism 132 further includes a biasing part 1324 adapted to bias the latches 1320 to engage with the side bar portions 121 of the anti-rebound part 12. According to an example of construction, the biasing part 1324 can include a spring that is respectively connected with the two latches 1320. For example, the mount portion 13212 in each latch 1320 can have an opening 13213, and the biasing part 1324 can have two opposite ends respectively received in the openings 13213 of the two latches 1320. The biasing part 1324 can thereby urge the two latches 1320 in opposite directions for engaging with the two side bar portions 121 of the anti-rebound part 12.

According to another example of construction not shown, the biasing part may be configured to urge the latches 1320 to engage with the side bar portions 121 of the anti-rebound part 12 via a magnetic interaction. For example, each latch 1320 may carry a first magnetic element, and the biasing part may have a second magnetic element attached to the shell body 11, the two latches 1320 being urged in movement for engaging with the side bar portions 121 of the anti-rebound part 12 via a magnetic interaction between the first magnetic elements and the second magnetic element.

Figure 12:
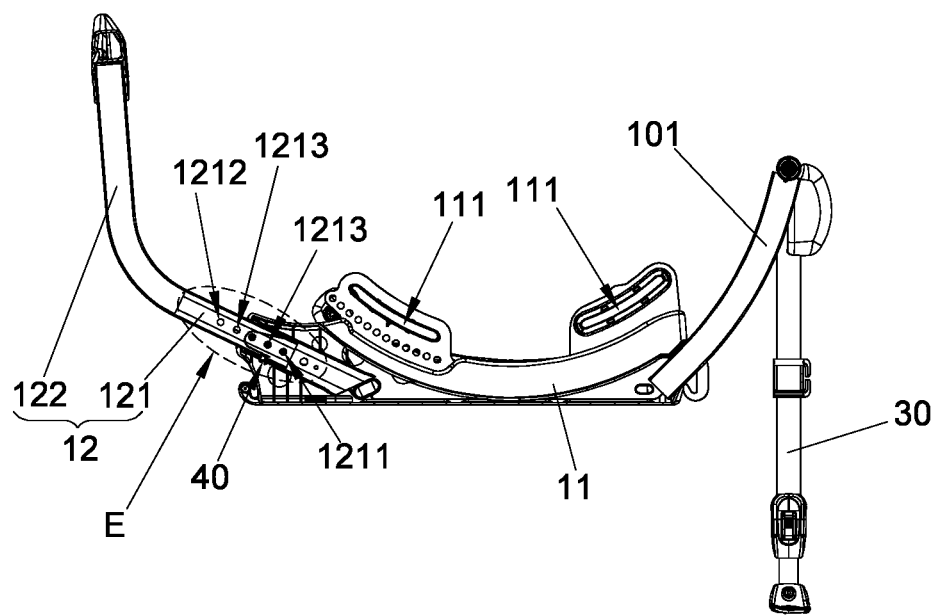
FIG. 12 is a schematic view illustrating some inner construction details of the anti-rebound part provided in the support base.
Figure 13:
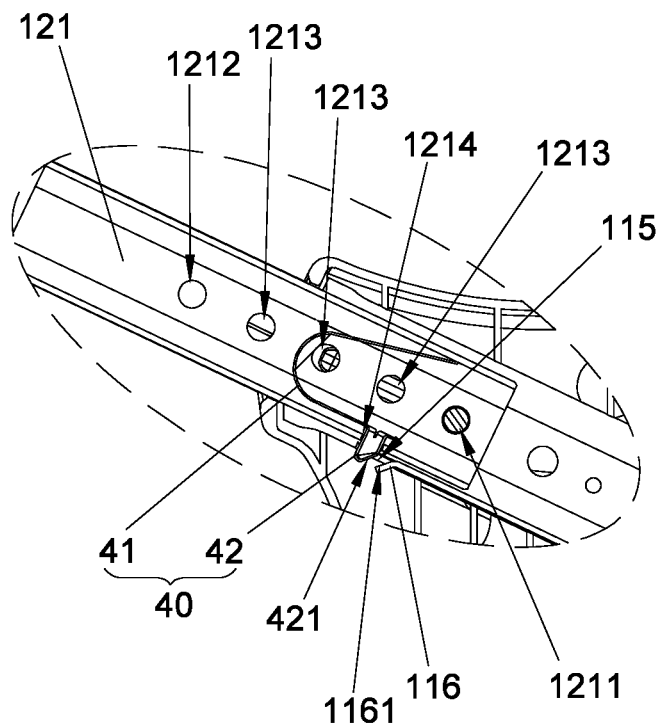
FIG. 13 is an enlarged view of portion E shown in FIG. 12.

Referring to FIGS. 12 and 13, the support base 10 can further include a limiting mechanism 40 operable independently of the locking mechanism 132 to stop the anti-rebound part 12 at an outmost extended position, which can prevent excessive sliding that may cause undesirable separation of the anti-rebound part 12 from the shell body 11. According to an example of construction, the limiting mechanism 40 can be carried with the anti-rebound part 12, and can include a resilient part 41 and a protrusion 42 connected with each other. The resilient part 41 is disposed inside a hollow interior of one side bar portion 121 of the anti-rebound part 12. The protrusion 42 is attached to an end of the resilient part 41, and is movable to extend outward or retract inward the side bar portion 121 through a hole 1214 provided in the side bar portion 121. According to an example of construction, the resilient part 41 may be a bent strip made of a metallic material, such as steel. According to another example of construction, the resilient part 41 may be a spring. The resilient part 41 can apply a biasing force for urging the protrusion 42 to extend outside the side bar portion 121 through the hole 1214. The shell body 11 can have a locking opening 115 adapted to receive the engagement of the protrusion 42. When the anti-rebound part 12 slides away from the shell body 11 and reaches the outmost extended position, the protrusion 42 biased by the resilient part 41 can extend outward through the hole 1214 and engage with the locking opening 115 for preventing further sliding of the anti-rebound part 12 away from the shell body 11. According to an example of construction, the latches 1320 of the locking mechanism 132 and the protrusion 42 of the limiting mechanism 40 can be configured to be concurrently engaged for locking the anti-rebound part 12 in the outmost extended position.

According to an example of construction, the protrusion 42 and/or the locking opening 115 may be configured to achieve a unidirectional locking engagement that prevents sliding of the anti-rebound part 12 away from the shell body 11 but allows sliding of the anti-rebound part 12 toward the shell body 11. For example, an edge 116 of the locking opening 115 can be in sliding contact with an edge 421 of the protrusion 42 so as to urge the protrusion 42 to disengage from the locking opening 115 when the anti-rebound part 12 is urged to slide from the outmost extended position toward the shell body 11. According to an example of construction, one or both of the edges 116 and 421 can have a ramp surface for facilitating the sliding contact.

Exemplary operation of the child safety seat 100 is described hereinafter with reference to FIGS. 1-13. The child safety seat 100 can be installed on a vehicle seat in a rear facing position with the abutting portion 122 of the anti-rebound part 12 facing the seatback of the vehicle seat. By sliding the child seat 20 on the support base 10, the inclination of the child seat 20 relative to the support base 10 can be adjusted according to the size of the child sitting on the child safety seat 100. Moreover, the anti-rebound part 12 can be adjusted to set a desirable leg room at the front of the child seat 20.

To adjust the anti-rebound part 12, the caregiver can operate and slide the release actuator 131 toward the interior of the shell body 11. This sliding displacement of the release actuator 131 causes the linking parts 13231 and 13232 of the two linkage assemblies 1323 to rotate, which concurrently urges the two latches 1320 to slide transversally toward each other against the biasing force of the biasing part 1324 and consequently disengage from the two side bar portions 121 of the anti-rebound part 12. The anti-rebound part 12 is thereby unlocked, and can slide relative to the shell body 11 for adjusting the leg room. For example, the anti-rebound part 12 can slide in an extending direction that displaces the abutting portion 122 away from the child seat 20 for increasing the leg room, or can slide in a retracting direction that displaces the abutting portion 122 toward the child seat 20 for reducing the leg room. Once the anti-rebound part 12 is in the desired position, the caregiver releases the release actuator 131 so that the latches 1320 can slide transversally away from each other and respectively engage with the two side bar portions 121 of the anti-rebound part 12 owing to the biasing force of the biasing part 1324. The anti-rebound part 12 is thereby locked in position relative to the shell body 11. In addition to or rather than adjusting the position of the anti-rebound part 12 relative to the shell body 11, the child seat 20 may also slide relative to the shell body 11 toward or away from the abutting portion 122 for adjusting the leg room at the front of the child seat 20. Once the child safety seat 100 is installed on the vehicle seat in the rear facing position, the anti-rebound part 12 can extend from the support base 10 below the child seat 20 to a height above the seat portion 22 with the abutting portion 122 positioned adjacent to the seatback of the vehicle seat. Accordingly, the abutting portion 122 can be interposed between the shell body 11 of the support base 10 and the seatback of the vehicle seat with no contact between the shell body 11 and the seatback of the vehicle seat. Moreover, the support leg 30 can be arranged to extend generally vertically and abut against a floor of the vehicle.

Advantages of the child safety seat described herein include the ability to provide a support base having an adjustable anti-rebound part. When the child safety seat is installed on a vehicle seat in a rear facing position, the anti-rebound part is positioned adjacent to the seatback of the vehicle seat to prevent the child safety seat from rebounding and causing extra motion that could injure the child. Since the anti-rebound part extends upward from the shell body of the support base below the child seat, the contact area between the anti-rebound part and the seatback of the vehicle seat may be increased, which can provide higher stability. Moreover, because the leg room at the front of the child seat can be adjusted by sliding the anti-rebound part relative to the shell body and/or sliding the child seat rearward or forward relative to the shell body, the leg room can have an increased range of adjustment.

Realization of the child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
a child seat; and
a support base having a shell body adapted to provide support for the child seat, the shell body having a housing portion, and a bottom surface adapted to be placed on a vehicle seat, the bottom surface being integrally defined by the shell body, wherein the support base includes:
an anti-rebound part connected with the shell body for sliding movements through an interior of the housing portion along a sliding axis that is tilted at an angle relative to the bottom surface of the shell body, the anti-rebound part having an abutting portion tilted relative to the sliding axis that extends upward at a front of the child seat, the anti-rebound part being slidable along the sliding axis relative to the shell body for displacing the abutting portion away from the child seat or toward the child seat so as to adjust a leg room for a child; and
a locking mechanism operable to lock the anti-rebound part in position with respect to the shell body.

2. The child safety seat according to claim 1, wherein the anti-rebound part includes two side bar portions that are transversally spaced apart from each other and are respectively connected with the abutting portion, the two side bar portions being slidably connected with the housing portion, and the abutting portion extending upward at an angle from the two side bar portions.

3. The child safety seat according to claim 2, wherein the abutting portion has two side segments respectively connected with the two side bar portions, and a transversal portion respectively connected with the two side segments, the transversal portion being adapted to serve as a footrest for a child sitting on the child seat.

4. The child safety seat according to claim 1, wherein the locking mechanism engages with the anti-rebound part to lock the anti-rebound part in position, and the support base further includes a release actuator operable to cause the locking mechanism to disengage from the anti-rebound part so that the anti-rebound part is unlocked for sliding adjustment along the sliding axis.

5. The child safety seat according to claim 4, wherein the release actuator is movably coupled to the locking mechanism, whereby the release actuator and the locking mechanism are movable concurrently to lock and unlock the anti-rebound part.

6. The child safety seat according to claim 4, wherein the locking mechanism includes two latches disposed inside the shell body transversally spaced apart from each other, each of the two latches being movable to engage with the anti-rebound part for locking the anti-rebound part in position or to disengage from the anti-rebound part for unlocking the anti-rebound part.

7. The child safety seat according to claim 6, wherein the two latches are respectively connected slidably with the shell body.

8. The child safety seat according to claim 6, wherein the locking mechanism further includes a biasing part adapted to bias the two latches to engage with the anti-rebound part.

9. The child safety seat according to claim 6, wherein the two latches are respectively coupled to the release actuator via two linkage assemblies.

10. The child safety seat according to claim 9, wherein each of the two linkage assemblies respectively includes a first linking part and a second linking part, the first linking part being respectively connected pivotally with the release actuator and one of the two latches, and the second linking part being respectively connected pivotally connected with the shell body and the first linking part.

11. The child safety seat according to claim 10, wherein the second linking part is pivotally connected with the first linking part at a location between a pivotal connection of the first linking part with the release actuator and a pivotal connection of the first linking part with the one of the two latches.

12. The child safety seat according to claim 4, wherein the release actuator is exposed for operation at an opening provided in the shell body, the opening being provided on an upper surface of the shell body facing upward.

13. The child safety seat according to claim 4, wherein the shell body is fixedly connected with a transversal rail, and the locking mechanism includes a latch having a sleeve portion slidably mounted on the transversal rail, the latch being thereby slidable along the transversal rail to engage with or disengage from the anti-rebound part.

14. The child safety seat according to claim 4, wherein the locking mechanism includes a latch disposed inside the shell body that is movable to engage with the anti-rebound part for locking the anti-rebound part in position or to disengage from the anti-rebound part for unlocking the anti-rebound part, and the release actuator is coupled to the latch via a linkage assembly including a first linking part and a second linking part, the first linking part being respectively connected pivotally with the release actuator and the latch, and the second linking part being respectively connected pivotally connected with the shell body and the first linking part.

15. The child safety seat according to claim 14, wherein the second linking part is pivotally connected with the first linking part at a location between a pivotal connection of the first linking part with the release actuator and a pivotal connection of the first linking part with the latch.

16. The child safety seat according to claim 1, wherein the support base further includes a limiting mechanism operable independently of the locking mechanism to stop the anti-rebound part at an outmost extended position.

17. The child safety seat according to claim 16, wherein the limiting mechanism is carried with the anti-rebound part and includes a resilient part and a protrusion connected with each other, the protrusion being biased by the resilient part to engage with a locking opening provided in the shell body when the anti-rebound part reaches the outmost extended position.

18. The child safety seat according to claim 1, wherein the child seat is slidably connected with the shell body of the support base, the child seat being slidable relative to the shell body toward or away from the abutting portion.

19. The child safety seat according to claim 1, wherein the child safety seat is installable on a vehicle seat with the abutting portion interposed between the shell body and a seatback of the vehicle seat.

20. The child safety seat according to claim 1, wherein the support base further includes a support extension connected with an end of the shell body opposite to the anti-rebound part, and a support leg connected with the support extension, the support extension having a curved shape that extends upward from the shell body and at least partially conforms with a rear profile of the child seat, and the support leg being extendible downward from the support extension for abutting against a vehicle floor.

21. A child safety seat comprising:
a child seat; and
a support base having a shell body adapted to provide support for the child seat, wherein the support base includes:
an anti-rebound part connected with the shell body for sliding movements along a sliding axis, the anti-rebound part having an abutting portion tilted relative to the sliding axis that extends upward at a front of the child seat, the anti-rebound part being slidable along the sliding axis relative to the shell body for displacing the abutting portion away from the child seat or toward the child seat so as to adjust a leg room for a child;
a locking mechanism operable to lock the anti-rebound part in position with respect to the shell body, the locking mechanism including a latch disposed inside the shell body that is movable to engage with the anti-rebound part for locking the anti-rebound part in position or to disengage from the anti-rebound part for unlocking the anti-rebound part; and
a release actuator operable to cause the locking mechanism to disengage from the anti-rebound part so that the anti-rebound part is unlocked for sliding adjustment along the sliding axis, the release actuator being coupled to the latch via a linkage assembly including a first linking part and a second linking part, the first linking part being respectively connected pivotally with the release actuator and the latch, and the second linking part being respectively connected pivotally connected with the shell body and the first linking part.

22. The child safety seat according to claim 21, wherein the second linking part is pivotally connected with the first linking part at a location between a pivotal connection of the first linking part with the release actuator and a pivotal connection of the first linking part with the latch.

23. A child safety seat comprising:
a child seat; and
a support base having a shell body adapted to provide support for the child seat, wherein the support base includes:
an anti-rebound part connected with the shell body for sliding movements along a sliding axis, the anti-rebound part having an abutting portion tilted relative to the sliding axis that extends upward at a front of the child seat, the anti-rebound part being slidable along the sliding axis relative to the shell body for displacing the abutting portion away from the child seat or toward the child seat so as to adjust a leg room for a child;
a locking mechanism operable to lock the anti-rebound part in position with respect to the shell body, the locking mechanism engaging with the anti-rebound part to lock the anti-rebound part in position; and
a release actuator operable to cause the locking mechanism to disengage from the anti-rebound part so that the anti-rebound part is unlocked for sliding adjustment along the sliding axis, the release actuator being exposed for operation at an opening provided in the shell body, the opening being provided on an upper surface of the shell body facing upward.

24. The child safety seat according to claim 23, wherein the release actuator is movably coupled to the locking mechanism, whereby the release actuator and the locking mechanism are movable concurrently to lock and unlock the anti-rebound part.

25. The child safety seat according to claim 23, wherein the locking mechanism includes a latch disposed inside the shell body that is movable to engage with the anti-rebound part for locking the anti-rebound part in position or to disengage from the anti-rebound part for unlocking the anti-rebound part, and the release actuator is coupled to the latch via a linkage assembly including a first linking part and a second linking part, the first linking part being respectively connected pivotally with the release actuator and the latch, and the second linking part being respectively connected pivotally with the shell body and the first linking part.

26. The child safety seat according to claim 25, wherein the second linking part is pivotally connected with the first linking part at a location between a pivotal connection of the first linking part with the release actuator and a pivotal connection of the first linking part with the latch.

* * * * *